United States Patent [19]
Matsumoto

[11] Patent Number: 5,737,522
[45] Date of Patent: Apr. 7, 1998

[54] SERIAL INPUT/OUTPUT CIRCUIT WITH AN AUTOMATIC TRANSFER FUNCTION

[75] Inventor: Naoko Matsumoto, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 742,825

[22] Filed: Oct. 31, 1996

[30] Foreign Application Priority Data

Jun. 17, 1996 [JP] Japan .................. 8-155386

[51] Int. Cl.$^6$ .............................. G06F 13/00; G06F 13/38
[52] U.S. Cl. ................. 395/185.02; 370/359; 395/821; 395/843
[58] Field of Search .......................... 395/185.02, 823, 395/878, 500, 843, 185.03, 200.13; 371/32, 2.2, 40.1; 370/419, 359

[56] References Cited

U.S. PATENT DOCUMENTS

| | | | |
|---|---|---|---|
| 4,510,603 | 4/1985 | Catiller | 371/21.2 |
| 4,596,014 | 6/1986 | Holeman | 371/49.1 X |
| 4,729,095 | 3/1988 | Colley et al. | 395/379 |
| 4,959,813 | 9/1990 | Todoroki | 365/189.12 |
| 5,014,237 | 5/1991 | Masters et al. | 395/500 |
| 5,333,274 | 7/1994 | Amini et al. | 395/185.03 |

FOREIGN PATENT DOCUMENTS

| | | |
|---|---|---|
| 60-559 | 1/1985 | Japan . |
| 4357728 | 12/1992 | Japan . |
| 561783 | 3/1993 | Japan . |

OTHER PUBLICATIONS

Mitsubishi microcomputer user's manual 3817 series p. 20 issued on 1994 by Mitsubishi Electric Corporation.

*Primary Examiner*—Ly Hua
*Attorney, Agent, or Firm*—Leydig, Voit & Mayer, Ltd.

[57] ABSTRACT

A serial input/output circuit with an automatic transfer function can easily re-transfer correct data even if a transfer error occurs during automatic transfer. When the transfer of one data has been completed, an automatic transfer data pointer normally automatically updates its contents and indicates an address in an automatic transfer RAM, which corresponds to data to be next transferred. An error generation active circuit makes an error control signal significant when an error detecting circuit detects an error produced in data or the occurrence of the error in the data is notified from a transfer opposite party. When the error control signal is made significant, the automatic transfer data pointer and the transfer counter do not update their values.

12 Claims, 8 Drawing Sheets

SERIAL INPUT/OUTPUT CIRCUIT WITH AN AUTOMATIC TRANSFER FUNCTION

BACKGROUND OF THE INVENTION

1. Field of the Invention

The present invention relates to a serial input/output circuit incorporated into a microcomputer or the like and having the function of automatically and continuously transferring respective data of one block composed of data of one word or more serially.

2. Description of the Prior Art

FIG. 7 is a block diagram showing a conventional serial input/output circuit with an automatic transfer function, which has been described in, for example, Mitsubishi Single Chip Microcomputer User's Manual, 3817 Group (published by Mitsubishi Electric Corp., in 1994). Accordingly, a serial input/output circuit with an automatic transfer function, which has been incorporated into a microcomputer, will be described here by way of example. In the same drawing, reference numeral 1 indicates an automatic transfer RAM corresponding to a RAM in which data to be automatically transferred is stored. Reference numeral 2 indicates an address decoder for supplying address data on a main address bus 15 to the automatic transfer RAM 1, decoding address data on a local address bus 16 and supplying the decoded data to the automatic transfer RAM 1. Reference numeral 3 indicates an automatic transfer data pointer for pointing out or specifying a storage address in the automatic transfer RAM 1, at which data to be automatically transferred is stored. Reference numeral 4 indicates a transfer counter for indicating the quantity of untransferred data. Reference numeral 5 indicates an internal synchronizing clock signal for the microcomputer.

Reference numeral 6 indicates a clock input/output terminal (SCLK terminal) to and from which a clock signal for data transfer is inputted and outputted. Reference numeral 7 indicates a synchronous control circuit for controlling the timing of data transfer. Reference numeral 8 indicates a shift register for shifting transfer data. Reference numeral 9 indicates a transmitting terminal (SOUT terminal) for sending out the transfer data. Reference numeral 10 indicates a receiving terminal (SIN terminal) for receiving the transferred data. Reference numeral 11 indicates an automatic transfer interval register to which an automatic transfer interval is set. Reference numeral 12 indicates an automatic transfer control circuit for determining the state of transfer of data. Reference numeral 102 indicates a switch for determining whether a clock signal supplied to the synchronous control circuit 7 is regarded as the internal synchronizing clock signal 5 or an external synchronizing clock signal supplied through the clock input/output terminal 6. Reference numeral 104 indicates a switch for determining whether a clock signal outputted from the synchronous control circuit 7 is to be outputted from the clock input/output terminal 6. Reference numeral 13 indicates a main data bus corresponding to a data bus used for the microcomputer. Reference numeral 14 indicates a local data bus for carrying data to be automatically transferred. Reference numeral 15 indicates a main address bus corresponding to an address bus used for the microcomputer. Reference numeral 16 indicates a local address bus for supplying address data to the automatic transfer RAM 1 when the automatic transfer is being performed.

The operation of the serial input/output circuit will next be described with reference to a timing chart shown in FIG. 8.

Here, a description will be made of, as an example, the case in which a one-byte length shift register 8 is provided and data transfer is performed on a byte-by-byte basis. Further, the automatic transfer of data between two microcomputers each having the serial input/output circuit with the automatic transfer function, which has been constructed as shown in FIG. 7, will be described as an illustrative example. In the microcomputer on the transmitting side, a CPU (not shown) successively writes data to be automatically transferred to the automatic transfer RAM 1 through the main data bus 13 by software. At this time, the address decoder 2 supplies the address data on the main address bus 15 to the automatic transfer RAM 1 as it is. Next, a value corresponding to an address indicative of the leading data in the automatic transfer RAM 1 in which the data to be transferred have been stored, is set to the automatic transfer data pointer 3. Further, a specific bit set to a control register (not shown) is set on to make an automatic transfer mode effective. Then, the address decoder 2 is set so as to supply address data corresponding to the value in the automatic transfer data pointer 3 to the automatic transfer RAM 1. If necessary, the address decoder 2 adds a predetermined value to the value of the automatic transfer data pointer 3 and supplies the result of addition to the automatic transfer RAM 1 as address data.

Further, the CPU sets a value corresponding to an automatic transfer interval to be set, to the automatic transfer interval register 11 by using software. The automatic transfer interval corresponds to the time between the completion of transfer of one-byte data and the commencement of transfer of next data. Further, the automatic transfer interval is set so as to be longer than the time necessary for a process to be done during that time. When the CPU sets the number of bytes to be transferred, to the transfer counter 4 in software, an automatic transfer operation is started.

When the automatic transfer operation is started, the address data based on the value of the automatic transfer data pointer 3 is supplied from the address decoder 2 to the automatic transfer RAM 1 and data at an address indicated by the address data is outputted from the automatic transfer RAM 1 to the local data bus 14. The shift register 8 takes in or captures data on the local data bus 14 with timing indicated by T81 shown in FIG. 8, (g). The switch 102 is set in advance so as to select either one of the internal synchronizing clock signal 5 and an external synchronizing clock signal supplied through the clock input/output terminal 6. In the present circuit, the internal synchronizing clock signal 5 is defined as has been selected. In this case, the switch 104 is set such that the clock signal outputted from the synchronous control circuit 7 is outputted to the clock input/output terminal 6. If necessary, the synchronous control circuit 7 frequency-divides the internal synchronizing clock signal 5 so as to be supplied to the automatic transfer interval register 11 and the shift register 8. The clock signal from the clock input/output terminal 6 is supplied to the opposite party side to be transferred, i.e. a clock input/output terminal 6 on the receiving side in this case.

The shift register 8 shifts the contents thereof bit by bit in synchronism with the falling edge of the clock signal produced from the synchronous control circuit 7 (see FIG. 8, (a) and (b)) and outputs the shifted bit to the transmitting terminal 9. When the output of 8-bit data in the shift register 8 is finished, the synchronous control circuit 7 stops the supply of the signal therefrom. Further, the value of the automatic transfer data pointer 3 is decremented by "1". Namely, the value thereof indicates an address for the automatic transfer RAM 1 from which data is to be next read. Further, the value of the transfer counter 4 is decremented by "1". Address data based on the value of the automatic transfer data pointer 3 is supplied again from the address decoder 2 to the automatic transfer RAM 1, and data at an address indicated by the address data is outputted from the automatic transfer RAM 1 to the local data bus 14. The shift register 8 captures data on the local data bus 14 with timing indicated by T82 shown in FIG. 8, (g).

After the time corresponding to the contents of the automatic transfer interval register 11 has elapsed, the synchronous control circuit 7 resumes outputting the clock signal. Thus, the shift register 8 executes the above-described operation again to output 8-bit data.

The operation referred to above is repeatedly executed until the transfer counter 4 falls into underflow. When the automatic transfer control circuit 12 recognizes the underflow of the transfer counter 4, the automatic transfer control circuit 12 generates an interrupt request signal indicative of the completion of automatic transfer. The CPU recognizes the completion of automatic transmission of one-block data in response to the interrupt request signal.

In the microcomputer on the receiving side, the CPU sets a value corresponding to an address indicative of the leading data in an automatic transfer RAM 1 in which the received data are to be stored, to an automatic transfer data pointer 3 by software to thereby set the number of transfer bytes to a transfer counter 4. Further, a specific bit set to a control register (not shown) is set on to make an automatic transfer mode effective. A switch 102 is set so as to select the external synchronizing clock signal supplied through the clock input/output terminal 6. A switch 104 is set so that a clock signal produced from a synchronous control circuit 7 is not outputted to the clock input/output terminal 6. Thus, the synchronous control circuit 7 uses the external synchronizing clock signal input through the clock input/output terminal 6 from the opposite party side for transfer, in this case, the transmitting side.

A receiving terminal 10 is electrically connected to the transmitting terminal 9 employed in the microcomputer on the transmitting side. Thus, data (see FIG. 8, (a) and (c)) transferred in synchronism with the clock signal from the transmitting side is input to a receiving terminal 10. A shift register 8 shifts the contents thereof in synchronism with the falling edge of the clock signal. When the input of 8-bit data to the shift register 8 is completed, the shift register 8 outputs the contents to a local data bus 14. The data on the local data bus 14 is written into an address in an automatic transfer RAM 1, which is pointed out by an address decoder 2. This timing is indicated by T71 shown in FIG. 8, (f). Further, the value of the automatic transfer data pointer 3 is decremented by "1" and the value of the transfer counter 4 is decremented by "1". These processes are carried out for a period during which the transmitting side stops the supply of the clock signal therefrom, i.e., during a period corresponding to an automatic transfer interval. When the input of the clock signal from the clock input/output terminal 6 is resumed, the shift register 8 is activated again as mentioned above to input 8-bit data therein.

The above-described operation is repeatedly executed until the transfer counter 4 falls into underflow. When an automatic transfer control circuit 12 recognizes the underflow of the transfer counter 4, the automatic transfer control circuit 12 generates an interrupt request signal indicative of the completion of automatic transfer. The CPU recognizes the completion of automatic reception of one-block data in response to the interrupt request signal.

The simplex communication has been described to provide easy description. However, the serial input/output circuit with the automatic transfer function can perform a bidirectional communication (full duplex operation). When the full duplex operation is performed subsequently, one of the serial input/output circuits with the automatic transfer functions is defined as a first serial input/output circuit with an automatic transfer function, whereas the other thereof is defined as a second serial input/output circuit with an automatic transfer function. For cases where the full duplex operation is carried out, in the first serial input/output circuit, for example, a switch 102 is set so as to select an internal synchronizing clock signal 5. A switch 104 is set so that a clock signal produced from a synchronous control circuit 7 is outputted to a clock input/output terminal 6. The clock signal input through the clock input/output terminal 6 is supplied to a clock input/output terminal 6 employed in the second serial input/output circuit with the automatic transfer function. Thus, a switch 102 employed in the second serial input/output circuit with the automatic transfer function is set so as to select the clock signal input through the clock input/output terminal 6. Further, a switch 104 is set so that a clock signal produced from a synchronous control circuit 7 is not outputted to the clock input/output terminal 6. A transmitting terminal 9 employed in the first serial input/output circuit with the automatic transfer function is electrically connected to a receiving terminal 10 employed in the second serial input/output circuit with the automatic transfer function. A transmitting terminal 9 employed in the second serial input/output circuit with the automatic transfer function is electrically connected to a receiving terminal 10 employed in the first serial input/output circuit with the automatic transfer function.

A CPU in each of microcomputers successively writes data to be transferred into an automatic transfer RAM 1 by software. Next, a value corresponding to an address indicative of the leading data in the automatic transfer RAM 1 in which data to be transferred have been stored, is automatically set to an automatic transfer data pointer 3. Further, the CPU sets a value to be set corresponding to an automatic transfer interval, to an automatic transfer interval register 11 by software and sets the number of transfer bytes to a transfer counter 4.

The transfer of data from the automatic transfer RAM 1 to a shift register 8 and the transfer of received data from the shift register 8 to the automatic transfer RAM 1 are executed in the above-described manner. When the input of 8-bit data to both shift registers 8 and the output of 8-bit data therefrom have been finished, the data set to the shift register 8 from the automatic transfer RAM 1 in the first serial input/output circuit is transferred to the shift register 8 in the second serial input/output circuit. Further, the data set to the shift register 8 from the automatic transfer RAM 1 in the second serial input/output circuit is transferred to the shift register 8 in the first serial input/output circuit. In the respective serial input/output circuits with the automatic transfer functions, the data stored in each shift register 8 is shifted to the automatic transfer RAM 1 through a local data bus 14. In the automatic transfer RAM 1, the data is stored at an address pointed out by an address data outputted from an address decoder 2, i.e., an address pointed out by the automatic transfer data pointer 3. This timing corresponds to T71 shown in FIG. 8, (f).

In each serial input/output circuit with the automatic transfer function, the contents of the automatic transfer data pointer 3 is decremented by "1" immediately after T71, i.e., during a period b shown in FIG. 8, (d). Thus, the contents of the automatic transfer data pointer 3 become a value pointing out an address in the automatic transfer RAM 1, at which the data to be next transmitted has been stored. This value is also a value indicative of an address at which the next received data is stored. Simultaneously, the value of the transfer counter 4 is decremented by "1"(see a period b shown in FIG. 8, (e)). The data at the address, which is pointed out by the address data outputted from the address decoder 2, is shifted from the automatic transfer RAM 1 to the shift register 8. This timing corresponds to T82 shown in FIG. 8, (g).

As described above, the transfer of the received data from within the shift register 8 to the automatic transfer RAM 1, the updating of the address related to the automatic transfer RAM 1 and the transfer of the data from the automatic transfer RAM 1 to the shift register 8 are carried out within the period corresponding to the automatic transfer interval. When the period corresponding to the automatic transfer interval is terminated, the synchronous control circuit 7 employed in the first serial input/output circuit resumes outputting the clock signal. Thus, each of the serial input/output circuits with the automatic transfer functions performs the aforementioned operation again to transfer the data. The operation referred to above is repeatedly executed until the transfer counter 4 falls into underflow. When an automatic transfer control circuit 12 employed in each serial input/output circuit recognizes the underflow of the transfer counter 4, the automatic transfer control circuit 12 generates an interrupt request signal indicative of the completion of automatic transfer. The CPU in each microcomputer recognizes the completion of the automatic transfer of one-block data in response to the interrupt request signal.

Incidentally, there may be cases where the transfer counter 4 is not provided in each serial input/output circuit with the automatic transfer function. In this case, however, the final address for transfer data in the automatic transfer RAM 1 is fixed.

As is apparent from the above description, if the CPU writes one-block data into each serial input/output circuit and sets the values of the pointer and the counter by software, the CPU is released from the automatic transfer process. Thus, the CPU is not able to execute other process while the automatic transfer process is being carried out. However, such an automatic transfer process is not brought to a halt unless it is interrupted by software. When it is desired to discontinue the automatic transfer process when a transfer error arises during the transfer of one-block data, an interrupt process by software is required. When the position of occurrence of the error in one block is specified or the approximate position is found, a process for re-transferring data at that position is executed. At this time, the CPU must newly set the value of the pointer and the value of the counter, etc. in software.

There may be cases in which data to be re-transferred is not already included in the automatic transfer RAM 1 upon the re-transfer process. When the full duplex communication referred to above is being performed, for example, received data is stored in a data pre-transmitted area or region in the automatic transfer RAM 1. Thus, when the transfer of one-block data is terminated, data to be re-transferred does not exist in the automatic transfer RAM 1. In such a case, the CPU must perform even a process for writing data into the automatic transfer RAM 1 again.

Since the conventional serial input/output circuit with the automatic transfer function is constructed as described above, a problem arises that when the transfer error arises during the automatic transfer, much labor is required to execute the process for re-transferring the correct data and the time required to complete the re-transfer of the correct data is taken.

SUMMARY OF THE INVENTION

With the foregoing in view, it is an object of the present invention to provide a serial input/output circuit with an automatic transfer function, which is capable of re-transferring data automatically and in a short time.

The serial input/output circuit according to the present invention has update prohibiting means for prohibiting updating of both the value of pointer means for automatically updating the contents thereof after completion of the transfer of one data and supplying the value of data to be next transferred, which is indicative of an address in memory means, to the memory means, and the value of a transfer counter.

The update prohibiting means may include an error detecting circuit for detecting whether an error exists in transferred data, and an error generation active circuit for prohibiting the value of the pointer means and the value of the transfer counter from being updated when the error detecting circuit has detected a data error or the occurrence of the error in the data is notified from a transfer opposite party.

The serial input/output circuit may further include a continuous number monitoring means for detecting whether the transfer of data from the same address in the memory means exceeds a predetermined number of times.

The serial input/output circuit may be provided with a sharing terminal for outputting either one of a signal for notifying whether or not an error has occurred in data, to a transfer opposite party, and transfer data.

The serial input/output circuit may have a sharing terminal for inputting either one of a signal and transfer data sent from the transfer opposite party to notify whether or not the error has occurred in the data.

The serial input/output circuit may have a first sharing terminal for outputting either one of a signal for notifying whether or not an error has occurred in data, to a transfer opposite party, and transfer data, a second sharing terminal for inputting either one of a signal and transfer data sent from the transfer opposite party to notify whether or not the error has occurred in the data, transmission control means for supplying a signal for notifying whether or not an error has occurred in data to the transfer opposite party, to the first sharing terminal during an automatic transfer interval, and signal capturing means for taking in the signal input to the second sharing terminal during the automatic transfer period and supplying the same to the error generation active circuit.

The update prohibiting means may include a register to which a specific value is set, and a compare circuit for prohibiting the value of the pointer means from being updated when the value set to the register coincides with the value in the pointer.

DETAILED DESCRIPTION OF THE PREFERRED EMBODIMENTS

Embodiment 1

Figure 1:
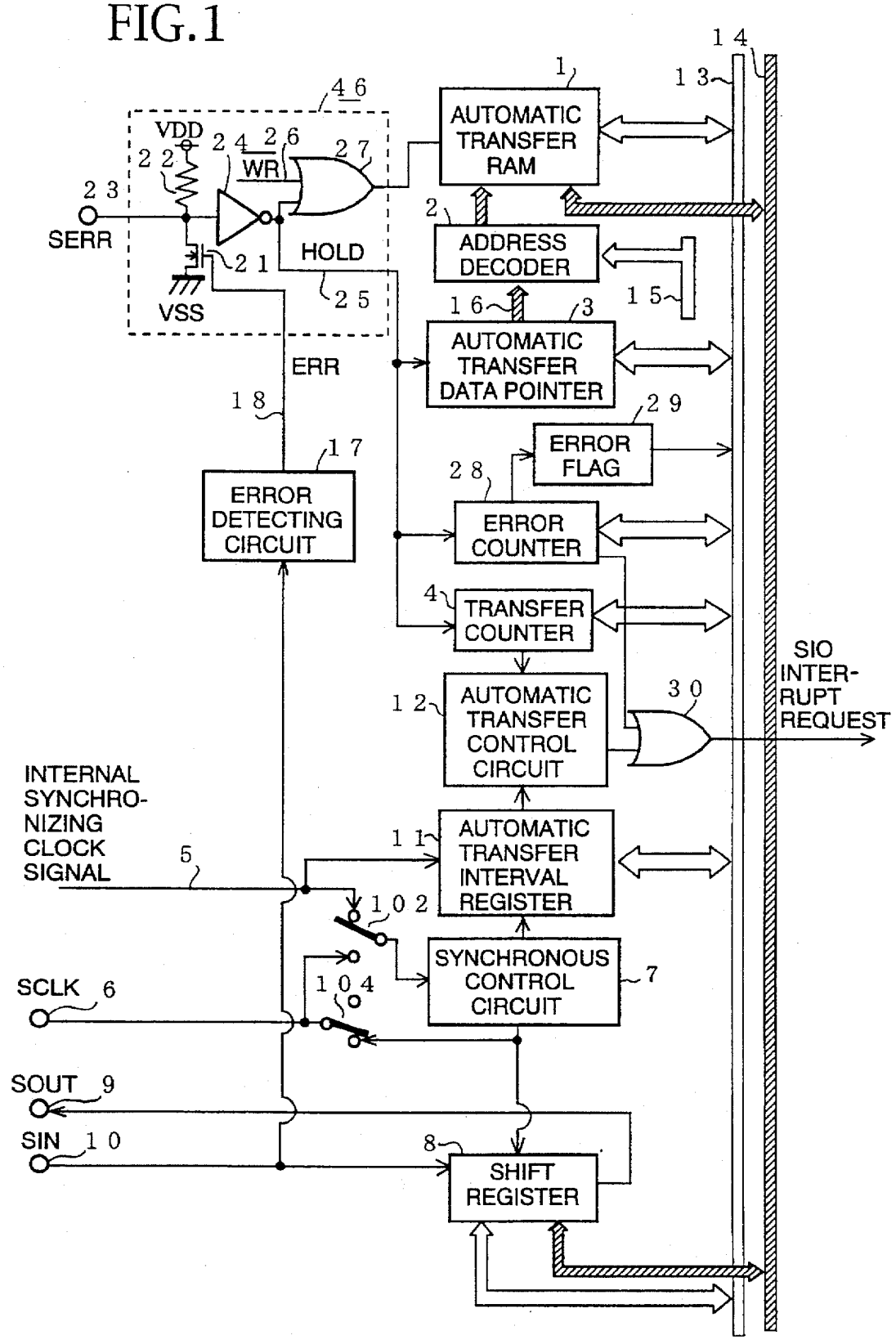
FIG. 1 is a block diagram showing a serial input/output circuit with an automatic transfer function, according to a first embodiment of the present invention.

FIG. 1 is a block diagram showing a serial input/output circuit with an automatic transfer function, according to a first embodiment of the present invention. A serial input/output circuit with an automatic transfer function, which is incorporated into a microcomputer, will now be described as an illustrative example. In FIG. 1, reference numeral 17 indicates an error detecting circuit for detecting an error produced in receive data input to a receiving terminal 10. Reference numeral 23 indicates an input/output terminal (SERR terminal) for an error detection signal. Reference numeral 28 indicates an error counter for counting the number of times that error-detected data is re-transferred. Reference numeral 29 indicates an error flag controlled based on the output of the error counter 28. Reference numeral 30 indicates a logical OR circuit (OR circuit) for summing logically a signal outputted from the error counter 28 when the count value of the error counter 28 has reached a predetermined value, and a signal indicative of the completion of transfer of data from an automatic transfer control circuit 12. Reference numeral 46 indicates an error generation active circuit activated when an internal error detection signal (ERR signal) 18 sent from the error detecting circuit 17 becomes significant or when the generation of an error in data is notified from a transfer destination or opposite party through the SERR 23. In this case, the significant state of the internal error detection signal 18 is of an H level.

In the error generation active circuit 46, reference numeral 21 indicates an N channel transistor whose gate is supplied with the internal error detection signal 18 and whose drain is electrically connected to the input/output terminal 23. The source of the N channel transistor 21 is supplied with a ground potential VSS. Reference numeral 22 indicates a resistor provided between a power source VDD and the drain of the N channel transistor 21. Reference numeral 24 indicates an inverter circuit whose input is electrically connected to the drain of the N channel transistor 21. Reference numeral 27 indicates an OR circuit for summing logically an output produced from the inverter circuit 24 and a write signal 26 for writing data sent from a shift register 8 into an automatic transfer RAM 1. Reference numeral 25 indicates an error control signal (HOLD signal) corresponding the output produced from the inverter circuit 24.

Figure 7:
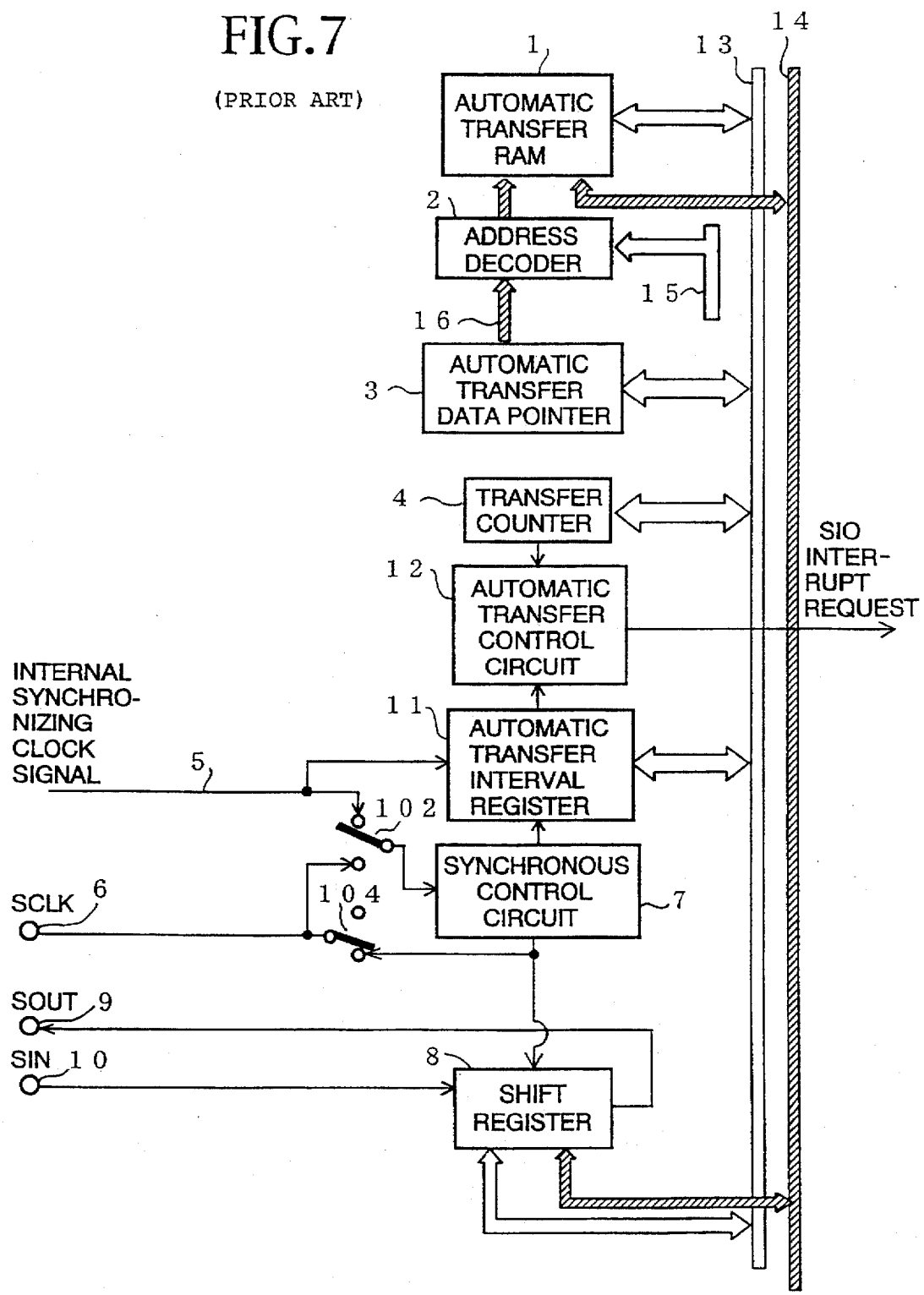
FIG. 7 is a block diagram illustrating a conventional serial input/output circuit with an automatic transfer function.

Other elements of structure are identical to those employed in a serial input/output circuit with an automatic transfer function, which is shown in FIG. 7. Incidentally, the automatic transfer RAM 1 is one realized example of a memory means. An automatic transfer data pointer 3 is one realized example of a pointer means. Further, the shift register 8 is one realized example of a transfer means. In the present embodiment, an update inhibiting means is realized by the error detecting circuit 17 and the error generation active circuit 46. Further, a continuous number monitoring means is realized by the error counter 28.

The operation of the serial input/output circuit will next be described.

A description will now be made of, as an example, the case in which a one-byte length shift register 8 is provided and data transfer is performed on a byte-by-byte basis. Further, the automatic transfer of data between two microcomputers each having the serial input/output circuit with the automatic transfer function shown in FIG. 1 will be described as an illustrative example.

Although a unidirectional or simplex communication can be also performed by the two serial input/output circuits with the automatic transfer functions, a full duplex communication will be taken as an example. Thus, in the first serial input/output circuit with the automatic transfer function, a switch 102 is set so as to select an internal synchronizing clock signal 5. A switch 104 is set so that a clock signal produced from a synchronous control circuit 7 is outputted to a clock input/output terminal 6. The clock signal from the clock input/output terminal 6 is supplied to a clock input/output terminal 6 in the second serial input/output circuit with the automatic transfer function. Thus, in the second serial input/output circuit, a switch 102 is set so as to select the clock signal input from the clock input/output terminal 6. A switch 104 is set so that a clock signal produced from a synchronous control circuit 7 is not outputted to the clock input/output terminal 6. A transmitting terminal 9 employed in the first serial input/output circuit is electrically connected to a receiving terminal 10 employed in the second serial input/output circuit. A transmitting terminal 9 employed in the second serial input/output terminal is electrically connected to a receiving terminal 10 employed in the first serial input/output circuit. Both input/output terminals 23 of the two serial input/output circuits are electrically connected to one another. In both the serial input/output circuits, when data is shifted from a given address in the automatic transfer RAM 1 to the corresponding shift register 8, data received immediately after its shift is stored at that address.

Writing of data into the automatic transfer RAM 1 by a CPU (not shown), the setting of the automatic transfer data pointer 3, a transfer counter 4 and an automatic transfer interval register 11 by the CPU, the transfer of data between the automatic transfer RAM 1 and the shift register 8 and the transfer of data from the shift register 8 are identical to those employed in the conventional serial input/output circuit shown in FIG. 7.

Each of the error detecting circuits 17 employed in the respective serial input/output circuits detects whether a transfer error occurs in data sent from the opposite serial input/output circuit. The error detecting circuit 17 performs an error detection by, for example, a parity check. When no transfer error is detected, the error detecting circuit 17 sets the internal error detection signal 18 to an L level. Then, the N channel transistor 21 in the error generation active circuit 46 continues to be in an off state. Thus, if an error detection signal input via the input/output terminal 23 from the opposite serial input/output circuit is not significant, then a signal level input to the inverter circuit 24 is brought to an H level. Incidentally, the significant level of the error detection signal is of an L level. Thus, the output of the inverter circuit 24 is L in level. Namely, an error control signal 25 is brought to an L level. Incidentally, the significant level of the error control signal 25 is of an H level. Further, the error control signal 25 is supplied to each of the OR circuit 27, the automatic transfer data pointer 3, the error counter 28 and the transfer counter 4.

Since the error control signal 25 is of the L level, the OR circuit 27 allows the write signal 26 to be sent to the automatic transfer RAM 1 to pass therethrough as it is. Accordingly, the writing of data outputted from the shift register 8 into the automatic transfer RAM 1 is not prohibited. Further, since the error control signal 25 is insignificant, the automatic transfer data pointer 3 and the transfer counter 4 perform normal operations. The normal operations are ones identical to the operations employed in the conventional serial input/output circuit shown in FIG. 7. The error counter 28 is activated when the error control signal 25 becomes significant. Here, the error counter 28 does not operate. Thus, each of both the serial input/output circuits with the automatic transfer functions performs an automatic transfer process in a manner similar to the conventional serial input/output circuit shown in FIG. 7.

When the error detecting circuit 17 in the first serial input/output circuit detects a transfer error produced in data input to the receiving terminal 10, the error detecting circuit 17 brings the internal error detection signal 18 to the H level corresponding to the significant level. Then, the N channel transistor 21 is turned on so that the ground potential appears at the drain thereof. Thus, the input of the inverter 24 is brought to an L level so that the error control signal 25 corresponding to the output of the inverter circuit 24 is brought to the H level corresponding to the significant level. Incidentally, the timing provided to perform the operation from the detection of the error by the error detecting circuit 17 to the determination of the level of the error control signal 25 is controlled so as to be antecedent to the timing provided to transfer the received data from the shift register 8 to the automatic transfer RAM 1.

When the error control signal 25 reaches the H level, the output of the OR circuit 27 is always rendered H in level. Namely, the write signal 26 is not transferred to the automatic transfer RAM 1. Further, the contents of the automatic transfer data pointer 3 is prohibited from being decremented by "1" Furthermore, the count value of the transfer counter 4 is also prohibited from being decremented by "1". Accordingly, the data received by the shift register 8 is not written into the automatic transfer RAM 1 during an automatic transfer interval. Further, since the contents referred to above are prohibited from being decremented by "1", the contents of the automatic data pointer 3 remain unchanged. Thus, the automatic transfer data pointer 3 designates or specifies an address for the automatic transfer RAM 1 to read therefrom transmit data whose transfer has been completed just previously and to write the received data therein. Further, since the contents referred to above are prohibited from being decremented by "1", the contents of the transfer counter 4 remain unchanged. Accordingly, the count value of the transfer counter 4 remains at a value obtained at the time that the transfer of the data whose transfer has been completed just previously, has been started. In other words, each of the contents of the automatic transfer RAM 1, the contents of the automatic transfer data pointer 3 and the count value of the transfer counter 4 is maintained at a state at the time that the transfer of data whose transfer has been completed just previously, has been started.

When the internal error detection signal 18 in the first serial input/output circuit is brought to the H level, an L level appears at the drain of the N channel transistor 21. However, the L level is transferred from the input/output terminal 23 to the input/output terminal 23 in the second serial input/ output circuit. As a result, the level of the input of the inverter circuit 24 employed in the second serial input/ output circuit is brought to an L level. Namely, the error control signal 25 is rendered H in level. Thus, even in the case of the second serial input/output circuit, each of the contents of the automatic transfer RAM 1, the contents of the automatic transfer data pointer 3 and the count value of the transfer counter 4 is maintained at a state at the time that the transfer of data whose transfer has been completed just previously, has been started.

The above-described embodiment shows as an example the case in which the error detecting circuit 17 employed in the first serial input/output circuit detects the transfer error. However, even in the case where the error detecting circuit 17 of the second serial input/output circuit detects the transfer error, each of the contents of the automatic transfer RAM 1, the contents of the automatic transfer data pointer 3 and the count value of the transfer counter 4, all of which are employed in the second serial input/output circuit, is maintained at the state at the time that the transfer of the data whose transfer has been terminated just previously, has been started. Further, each of the contents of the automatic transfer RAM 1, the contents of the automatic transfer data pointer 3 and the count value of the transfer counter 4, all of which are employed in the first serial input/output circuit, is maintained at the state at the time that the transfer of the data whose transfer has been completed just previously, has been started. In a word, when the error detecting circuit 17 employed in either of the serial input/output circuits detects the transfer error, each of the contents of the automatic transfer RAM 1, the contents of the automatic transfer data pointer 3 and the count value of the transfer counter 4, all of which are employed in each of the serial input/output circuits, is maintained at the state at the time that the transfer of the data whose transfer has been completed just previously, has been started.

In this state, the data of the automatic transfer RAMs 1 employed in both the serial input/output circuits are respectively transferred to the shift registers 8. Since data with an error, which has been received just previously, is not written into the automatic transfer RAM 1, the thus transferred data is identical to the data which has been transferred just previously.

When the period corresponding to the automatic transfer interval is terminated, the synchronous control circuit 7 employed in the first serial input/output circuit starts to output the clock signal again. Accordingly, the respective serial input/output circuits respectively perform the above-described operations again to transfer data. This data is identical to the data which has been transferred just previously. Namely, the re-transfer of the data is performed. During this time, the CPU has no participation in its transfer. When each of the error detecting circuits 17 employed in the respective serial input/output circuits does not detect a transfer error in the re-transferred data, the error detecting circuit 17 brings the internal error detection signal 18 to an L level. Accordingly, the OR circuit 27 allows the write signal 26 to be sent to the automatic transfer RAM 1 to pass therethrough as it is. Further, since the error control signal 25 is insignificant, the automatic transfer data pointer 3 and the transfer counter 4 respectively perform the normal operations. The above-described operations are repeatedly executed until the transfer counter 4 is put into underflow. When the automatic transfer control circuit 12 employed in each of the respective serial input/output circuits recognizes the underflow of the transfer counter 4, the automatic transfer control circuit 12 generates an interrupt request signal indicative of the completion of automatic transfer.

The interrupt request signal is outputted to the outside of each serial input/output circuit through the OR circuit 30. The CPU in each microcomputer accepts the interrupt request signal and recognizes that the automatic transfer of one block data has been finished.

The proper or correct data might not be occasionally received even if the re-transfer is repeated over and over again. In such a case, the transfer of one block is not completed for all time. The error counter 28 is used to avoid such a case. When the automatic transfer is started by software, the CPU sets a predetermined initial value to the error counter 28. The predetermined initial value indicates a value defined according to the allowable number of times that one data is re-transferred. When the error control signal 25 is brought to the H level, the count value of the error counter 28 is decremented by "1". The error detecting circuit 17 has the function of latching an output signal and holds the result of error detection on the preceding transferred data until the next error detection on transferred data is carried out. Thus, the value of the error counter 28 is restored to the initial value because the error control signal 25 is reset from the H to L levels.

When the re-transfer is continuously carried out, the error control signal 25 is maintained at the H level as it is. The down count of the error counter 28 will be defined as being produced due to the signal outputted from the synchronous control circuit 7. When the value of the error counter 28 is brought to the underflow, the re-transfer exceeding the allowable number of times is continuously performed. At this time, the error counter 28 generates a signal for interrupting the CPU. The interrupt request signal is outputted to the outside of the serial input/output circuit through the OR circuit 30. Further, the error counter 28 sets the error flag 29. The CPU detects using software upon interrupt processing that the error flag 29 is "1" and thereby recognizes that the re-transfer exceeding the allowable number of times has been performed. The automatic transfer is automatically discontinued simultaneously when the error counter 28 has generated the interrupt request signal.

The full duplex communication has been described in the present embodiment. However, the simplex communication may be performed that one serial input/output circuit performs only data transmission, whereas the other serial input/output circuit carries out only data reception. Even in this case, when the error detecting circuit 17 employed in the serial input/output circuit on the receiving side detects a transfer error, the error detecting circuit 17 notifies the occurrence of the transfer error to the serial input/output circuit on the transmitting side through the input/output terminal 23. The serial input/output circuit on the transmitting side performs the same process as that described above so as to re-transmit the data. Further, the serial input/output circuit on the receiving side also performs the same process as that described above so that the data in which the transfer error has arisen, is not written into the automatic transfer RAM 1.

In the present embodiment, the serial input/output circuit incorporated into each microcomputer has been described. However, this type of serial input/output circuit may be incorporated into another semiconductor device as well as built into the microcomputer. A single serial input/output circuit may be used. In this case, the serial input/output circuit is used together with a control device provided outwardly of the serial input/output circuit, for example.

According to the present embodiment, as has been described above, the data can be automatically re-transferred without the need for the control device such as the CPU or the like. Unlike to the conventional case, the data is re-transferred in the course of the transfer of one block. Thus, when the transfer of one block has been completed, the setting of each correct data to the automatic transfer RAM 1 on the opposite party side is ensured. Further, when the error counter 28 is provided, it is possible to avoid that the automatic transfer is not finished for all time by the repetition of the re-transfer.

Embodiment 2

Figure 2:
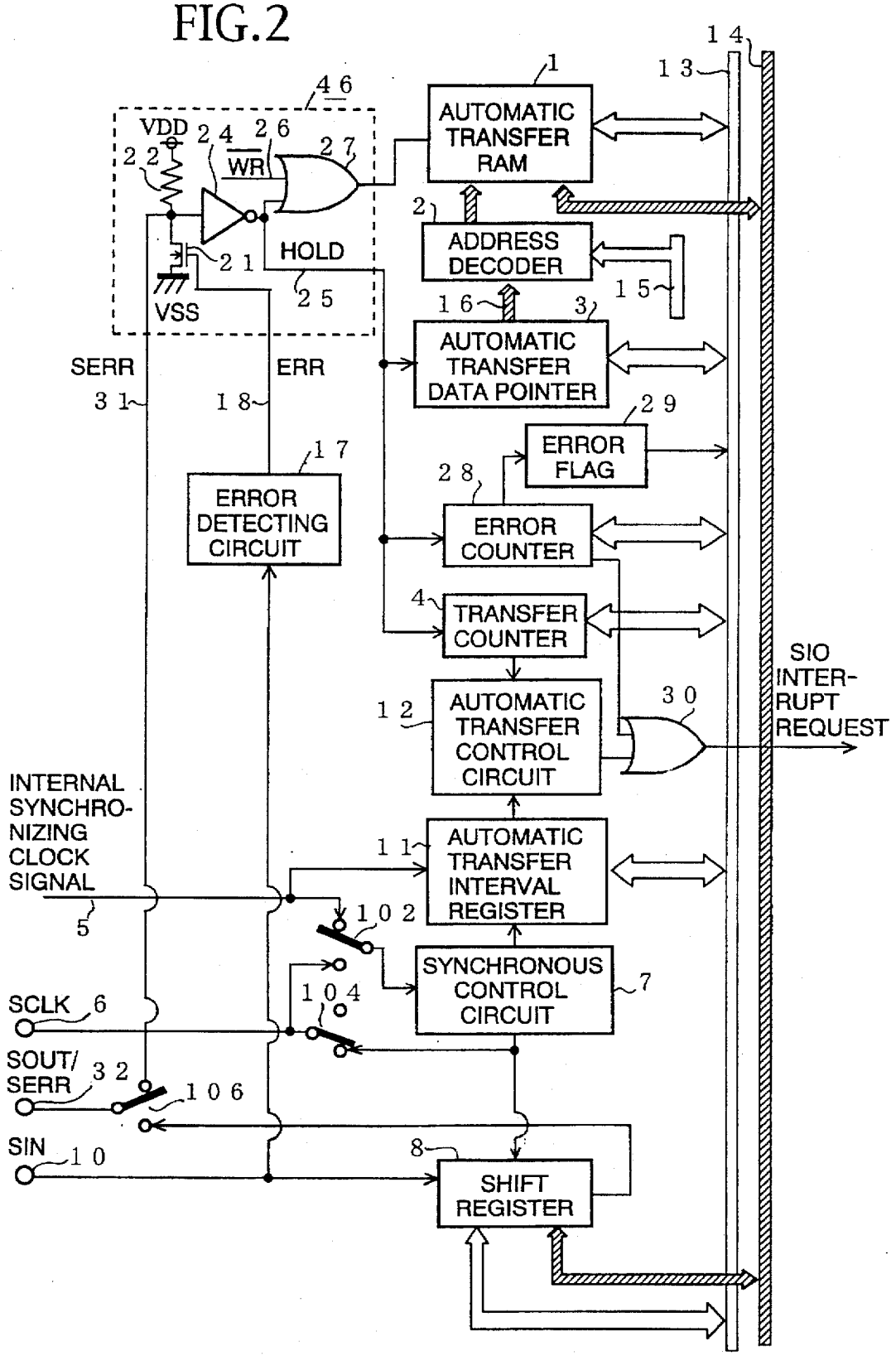
FIG. 2 is a block diagram illustrating a serial input/output circuit with an automatic transfer function, according to a second embodiment of the present invention.

FIG. 2 is a block diagram showing a serial input/output circuit with an automatic transfer function, according to a second embodiment of the present invention. Even in the case of the present embodiment, a serial input/output circuit with an automatic transfer function, which has been incorporated into a microcomputer, will be explained by way of example. In the same drawing, reference numeral 32 indicates a sharing terminal (SOUT/SERR terminal) from which an error detection signal 31 sent from an error generation active circuit 46 or data to be transmitted is outputted. Reference numeral 106 indicates a switch for selecting either one of the error detection signal 31 used as a signal applied to the sharing terminal 32 and the transmitted data. Other elements of structure are identical to those employed in the serial input/output circuit shown in FIG. 1. However, the input/output terminal 23 is not provided in the present embodiment.

The operation of the serial input/output circuit will now be described.

When a full duplex communication is performed, a CPU sets the switch 106 so that data to be transmitted, which is outputted from a shift register 8, is outputted to the sharing terminal 32. Since the transfer of the error detection signal 31 between the CPU and the opposite party side cannot be performed, an error detecting circuit 17 is prohibited from operating. This is because even if a transfer error is detected, the re-transfer to be made from the opposite party side cannot be expected. Accordingly, an internal error detection signal 18 is normally an L level and an error control signal 25 is normally an L level. Therefore, the serial input/output circuit is activated in a manner similar to the conventional serial input/output circuit shown in FIG. 7. Even when a simplex communication is carried out and this type of serial input/output circuit is used as the transmitting side, the switch 106 is set so that the transmit data outputted from the shift register 8 is outputted to the sharing terminal 32. Further, since the transfer of the error detection signal 31 between the CPU and the opposite party side cannot be performed, the error detecting circuit 17 is prohibited from operating. Accordingly, the serial input/output circuit with the automatic transfer function is activated in a manner similar to the conventional serial input/output circuit shown in FIG. 7.

When the simplex communication is made and the serial input/output circuit with the automatic transfer function is used as the receiving side, the switch 106 may be set such that the transmit data outputted from the shift register 8 is outputted to the sharing terminal 32. Alternatively, the switch 106 may be set so that the error detection signal 31 is outputted to the sharing terminal 32. Since the data cannot be transmitted from the shift register 8 in the serial input/output circuit used as the receiving side, the setting of the switch 106 for outputting the transmit data outputted from the shift register 8 to the sharing terminal 32 means that the switch 106 is set such that the error detection signal 31 is not transferred to the opposite party side. Namely, since the transfer of the error detection signal 31 to the opposite party side cannot be performed, the error detecting circuit 17 is prohibited from operating. Consequently, the serial input/ output circuit used as the receiving side is activated in a manner similar to the conventional serial input/output circuit shown in FIG. 7.

When the switch 106 is set such that the error detection signal 31 is outputted to the sharing terminal 32, the error detecting circuit 17 is set to a state of being able to operate, i.e., an active state. Namely, the error detecting circuit 17 is activated in a manner similar to the first embodiment. In this case, for example, the serial input/output circuit shown in FIG. 1 is used as the serial input/output circuit used as the opposite party, which performs only the transmit operation. Further, the sharing terminal 32 is electrically connected to the input/output terminal 23 employed in the serial input/output circuit shown in FIG. 1. When the serial input/output circuit shown in FIG. 1 is used as only for the transmit operation, no input is supplied to a receiving terminal 10 employed in the serial input/output circuit. Accordingly, the error detecting circuit 17 employed in the serial input/output circuit shown in FIG. 1 is not activated practically. Therefore, the error detection signal is not outputted from this serial input/output circuit. Thus, the input/output terminal 23 employed in the serial input/output circuit shown in FIG. 1 is substantially an input terminal. Further, the sharing terminal 32 employed in the serial input/output circuit shown in FIG. 2, which is used as the receiving side, serves as an output terminal dedicated for the error detection signal 31.

The transfer of data between the serial input/output circuit used as the transmitting side and the serial input/output circuit shown in FIG. 2, which is used as the receiving side, is executed in a manner similar to the first embodiment. Namely, when the error detecting circuit 17 employed in the serial input/output circuit used as the receiving side detects a transfer error, the error detecting circuit 17 sends an error detection signal 31 of an L level to the serial input/output circuit used as the transmitting side through the sharing terminal 32. The serial input/output circuit used as the transmitting side performs the same process as that executed by the first embodiment to re-transmit data. Further, the serial input/output circuit used as the receiving side also performs the same process as that executed by the first embodiment such that data in which a transfer error has arisen, is not written into the automatic transfer RAM 1. If the transfer error is not produced in the re-transferred data again, then the data is written into the automatic transfer RAM 1.

Incidentally, the present embodiment has described the serial input/output circuit which has been incorporated into the microcomputer. However, the present serial input/output circuit may be incorporated into another semiconductor device as well as incorporated into the microcomputer. A single serial input/output circuit with an automatic transfer function may be used. In this case, the single serial input/output circuit is used together with a control device provided outwardly of the serial input/output circuit, for example.

According to the present embodiment, as has been described above, the error detecting process can be executed when only the reception of data is performed. However, since the terminals for outputting and transmitting the error detection signal 31 share the use of one sharing terminal 32, the number of terminals can be reduced when the serial input/output circuit with the automatic transfer function is incorporated into the semiconductor device or the like.

Embodiment 3

Figure 3:
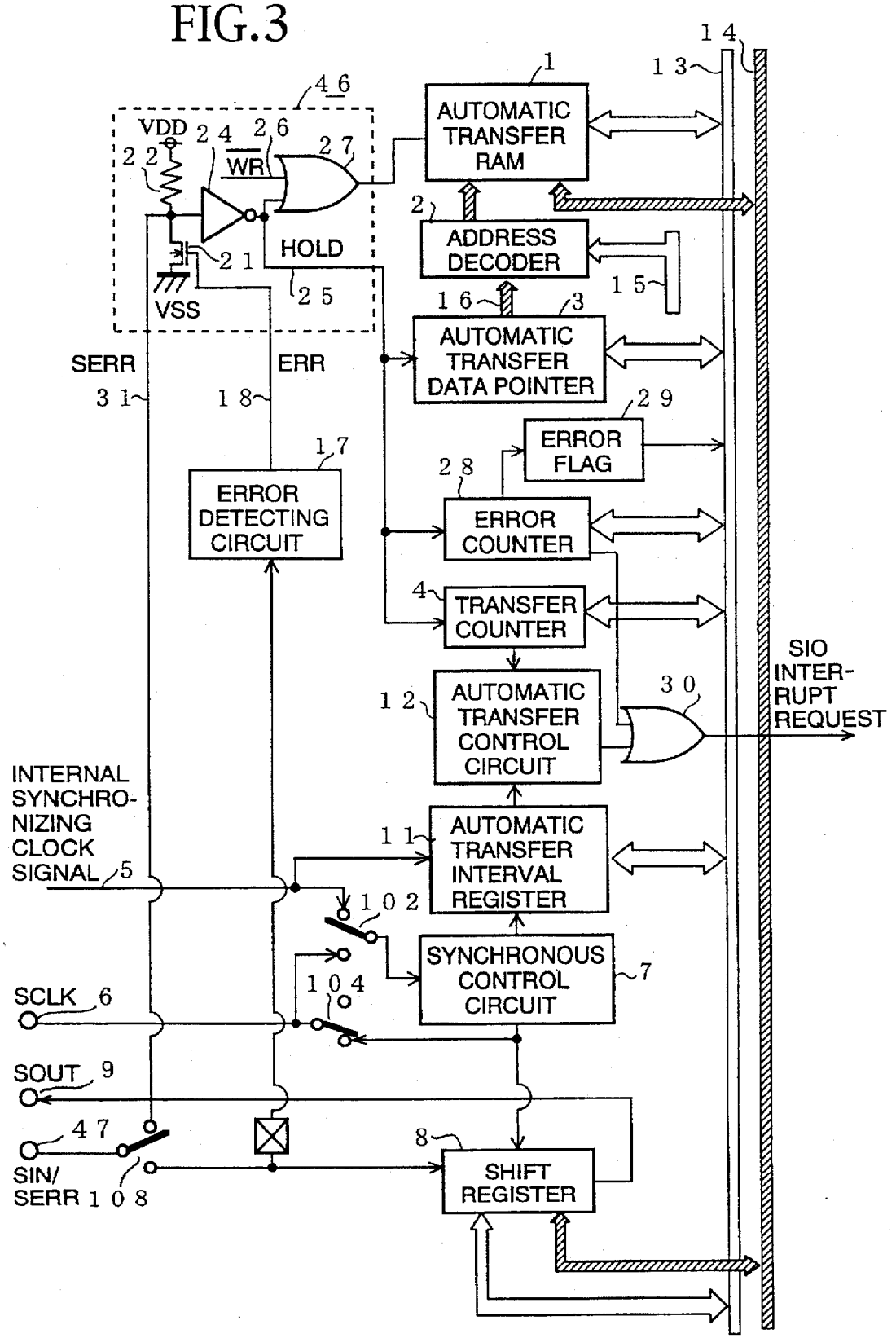
FIG. 3 is a block diagram showing a serial input/output circuit with an automatic transfer function, according to a third embodiment of the present invention.

The serial input/output circuit according to the second embodiment has carried out the error detecting process upon execution of only the reception of the data. Thus, a serial input/output circuit with an automatic transfer function may be provided which performs a process corresponding to an error detection signal 31 sent from the receiving side when only the transmission of data is performed. FIG. 3 is a block diagram showing the configuration of a serial input/output circuit with an automatic transfer function, according to a third embodiment of the present invention based on such a concept as referred to above. In the same drawing, reference numeral 108 indicates a switch for determining whether a signal input to a sharing terminal (SIN/SERR terminal) 47 is to be supplied to an error generation active circuit 46 or a shift register 8. Other elements of structure are identical to those employed in the serial input/output circuit shown in FIG. 2. However, the switch 106 and the sharing terminal 32 shown in FIG. 2 are not provided but a transmitting terminal 9 is provided. Further, the error detecting circuit 17 is not electrically connected to the input of the shift register 8.

The operation of the serial input/output circuit according to the third embodiment will now be described.

In the present serial input/output circuit with the automatic transfer function, the error detecting circuit 17 is deactivated. Namely, an internal error detection signal 18 corresponding to the output of the error detecting circuit 17 is normally maintained at an L level. It may be thus considered that the error detecting circuit 17 does not exist practically in the present serial input/output circuit. However, the error detecting circuit 17 is illustrated clearly in FIG. 3 to facilitate a comparison with other embodiments.

When the present serial input/output circuit is used as dedicated for transmission, a CPU (not shown) sets the switch 108 so that a signal input to a sharing terminal 47 is supplied to the error generation active circuit 46 as an error detecting signal 31. A serial input/output circuit with an automatic transfer function, which is used as the receiving side, is constructed as illustrated in FIG. 2 by way of example. The transfer of data between the serial input/output circuit used as the receiving side and the serial input/output circuit shown in FIG. 3 is executed in the same manner as in the first embodiment. Namely, when an error detecting circuit 17 employed in the serial input/output circuit used as the receiving side detects a transfer error, the error detecting circuit 17 sends an error detection signal 31 of an L level to the serial input/output circuit used as the transmitting side. In the serial input/output circuit shown in FIG. 3, which is used as the transmitting side, the error detection signal 31 is supplied to the error generation active circuit 46 through the sharing terminal 47 and the switch 108. The serial input/output circuit used as the transmitting side performs the same process as that executed by the first embodiment to re-transmit data. Further, the serial input/output circuit used as the receiving side also performs the same process as that executed by the first embodiment so that data in which a transfer error has arisen, is not written into an automatic transfer RAM 1. If the transfer error is not yet produced in the re-transferred data again, then the data is written into the automatic transfer RAM 1.

The serial input/output circuit shown in FIG. 3 can be also used when the full duplex communication is carried out. In this case, the transmitting terminal 9 is electrically connected to a receiving terminal of the serial input/output circuit used as the opposite party side. The sharing terminal 47, which serves as a data input terminal, is electrically connected to a transmitting terminal of the serial input/output circuit used as the opposite party side. When the serial input/output circuit configured as shown in FIG. 3 is used as the opposite party side, the transmitting terminal 9 is electrically connected to a sharing terminal 47 of the serial input/output circuit used as the opposite party side. When the serial input/output circuit configured as shown in FIG. 2 is used as the opposite party side, the sharing terminal 47 is electrically connected to the sharing terminal 32 of the serial input/output circuit used as the opposite party side. In the serial input/output circuit having the configuration shown in FIG. 3, the switch 108 is set so as to provide an electrical connection between the sharing terminal 47 and the shift register 8. In this case, the error detecting circuit 17 employed in the serial input/output circuit used as the opposite party side is set not so as to operate.

The serial input/output circuit shown in FIG. 3 can be also used as the receiving side when a simplex communication is made. In this case, the sharing terminal 47, which serves as the data input terminal, is electrically connected to the transmitting terminal of the serial input/output circuit used as the opposite party side. When the serial input/output circuit having the configuration shown in FIG. 2 is used as the opposite party side, the sharing terminal 47 is electrically connected to the sharing terminal 32 of the serial input/output circuit used as the opposite party side. In the serial input/output circuit having the configuration shown in FIG. 3, the switch 108 is set so as to provide an electrical connection between the sharing terminal 47 and the shift register 8. In this case, the error detecting circuit 17 employed in the serial input/output circuit used as the opposite party side is set not so as to operate.

Incidentally, the present embodiment has described the serial input/output circuit which has been incorporated into a microcomputer. However, the present serial input/output circuit may be incorporated into another semiconductor device as well as incorporated into the microcomputer. Further, a single serial input/output circuit with an automatic transfer function may be used. In this case, the single serial input/output circuit is used together with a control device provided outwardly of the serial input/output circuit, for example.

According to the present embodiment, as has been described above, the re-transfer process can be conducted when only the transmission of data is performed. However, since the terminals for inputting and receiving the error detection signal 31 share the use of one sharing terminal 47, the number of terminals can be reduced when the serial input/output circuit with the automatic transfer function is incorporated into the semiconductor device or the like.

Embodiment 4

Figure 4:
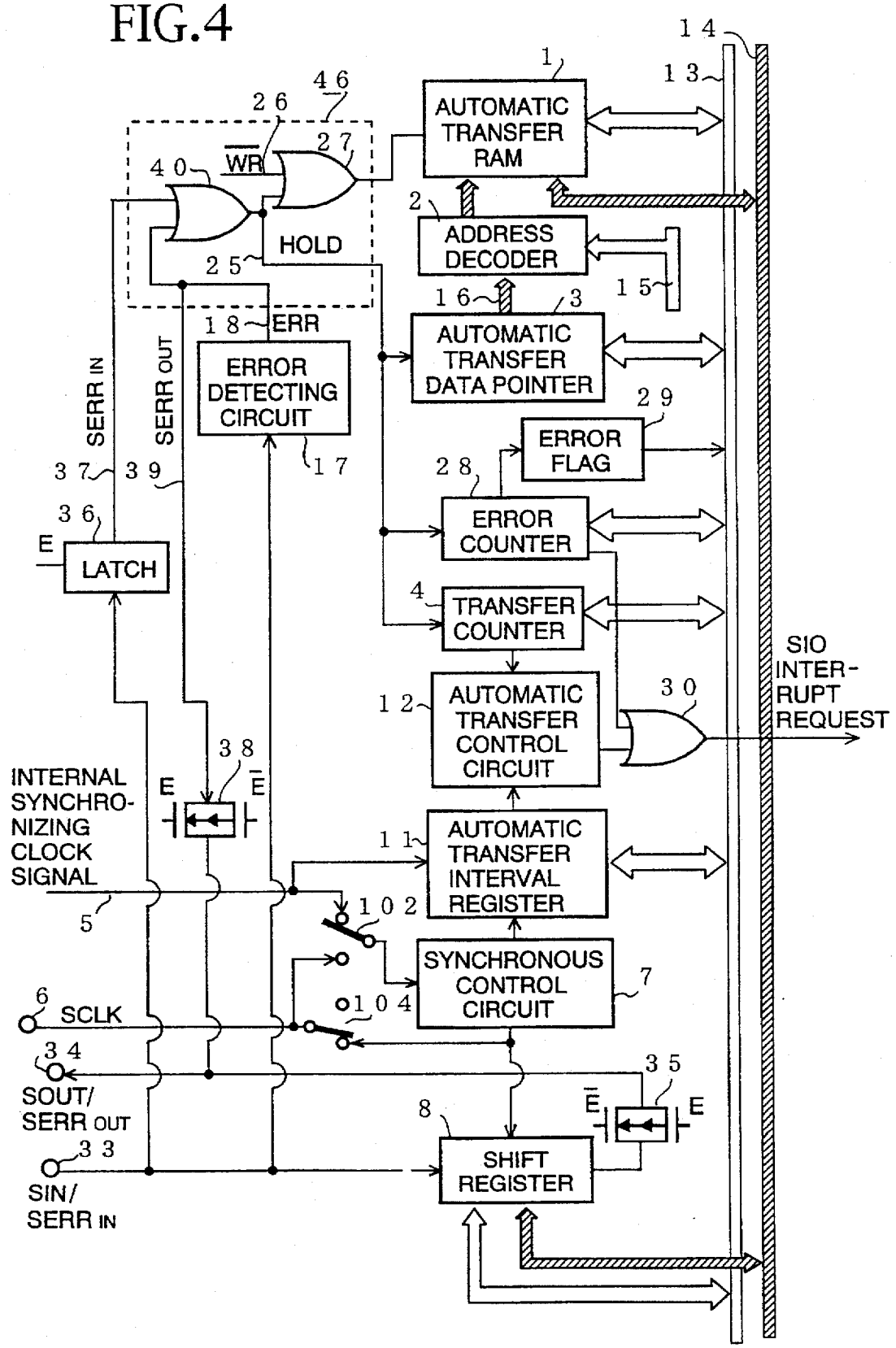
FIG. 4 is a block diagram illustrating a serial input/output circuit, according to a fourth embodiment of the present invention.

FIG. 4 is a block diagram showing a serial input/output circuit with an automatic transfer function, according to a fourth embodiment of the present invention. In the present embodiment, a serial input/output circuit with an automatic transfer function, which has been incorporated into a microcomputer, will be described by way of example. In the same drawing, reference numeral 33 indicates a sharing terminal (SIN/SERR$_{IN}$ terminal or second sharing terminal) which doubles as a terminal for receiving data and a terminal for inputting an error detection input signal (SEER$_{IN}$ signal) 37. Reference numeral 34 indicates a sharing terminal (SOUT/SERR$_{OUT}$ terminal or first sharing terminal) which doubles as a terminal for transmitting data and a terminal for outputting an error detection output signal (SEER$_{OUT}$ signal) 39. Reference numeral 35 indicates a transmission gate for allowing the output of a shift register 8 to pass therethrough so that the output thereof is supplied to the sharing terminal 34. Reference numeral 36 indicates a latch circuit for latching therein a signal input to the sharing terminal 33. Reference numeral 38 indicates a transmission gate for supplying an internal error detection signal 18 sent from an error detecting circuit 17 to the sharing terminal 34 as an error detection output signal 39. Other elements of structure are identical to those employed in the serial input/output circuit shown in FIG. 1. However, since the error detection input signal 37 and the error detection output signal 39 are respectively inputted and outputted through the sharing terminals 33 and 34 in this case, the input/output terminal 23 dedicated for the error detection signal is not provided. Further, an OR circuit 40 supplied with the error detection input signal 37 and the internal error detection signal 18 as inputs is provided within an error generation active circuit 46 as an alternative to the N channel transistor 21, the resistor 22 and the inverter circuit 24.

In the present embodiment, a transmission control means is realized by the transmission gates 35 and 38, and a signal capturing means is realized by the latch circuit 36.

The operation of the serial input/output circuit according to the fourth embodiment will be described with reference to a timing chart shown in FIG. 5.

A description will now be made of, as an example, the case in which data is automatically transferred between two microcomputers each having the serial input/output circuit constructed as shown in FIG. 4. A simplex communication may be carried out by the two serial input/output circuits. However, a full duplex communication will be taken as an example in the present embodiment. A sharing terminal 34 employed in a first serial input/output circuit corresponding to the serial input/output circuit included in one microcomputer is electrically connected to a sharing terminal 33 employed in a second serial input/output circuit corresponding to the serial input/output circuit included in the other microcomputer. A sharing terminal 33 employed in the first serial input/output circuit is electrically connected to a sharing terminal 34 employed in the second serial input/output circuit.

Writing of data into an automatic transfer RAM 1 by a CPU (not shown), the setting of switches 102 and 104 by the CPU, the setting of an automatic transfer data pointer 3, a transfer counter 4 and an automatic transfer interval register 11 by the CPU, the transfer of data between the automatic transfer RAM 1 and a shift register 8, and the transfer of data from the shift register 8 are identical to those employed in the first embodiment.

Figure 5:
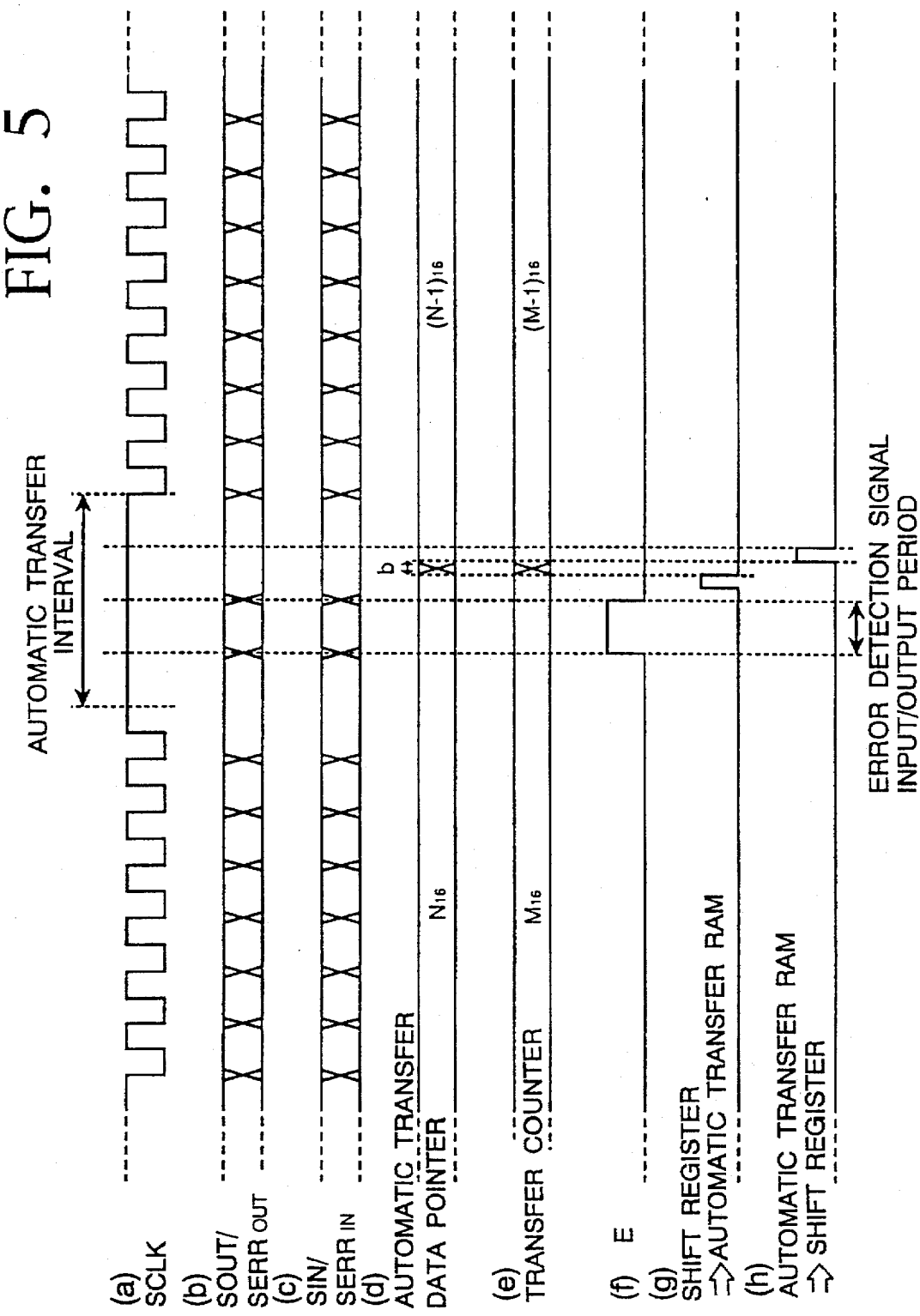
FIG. 5 is a timing chart for describing the operation of the serial input/output circuit with the automatic transfer function, according to the fourth embodiment of the present invention.
Figure 8:
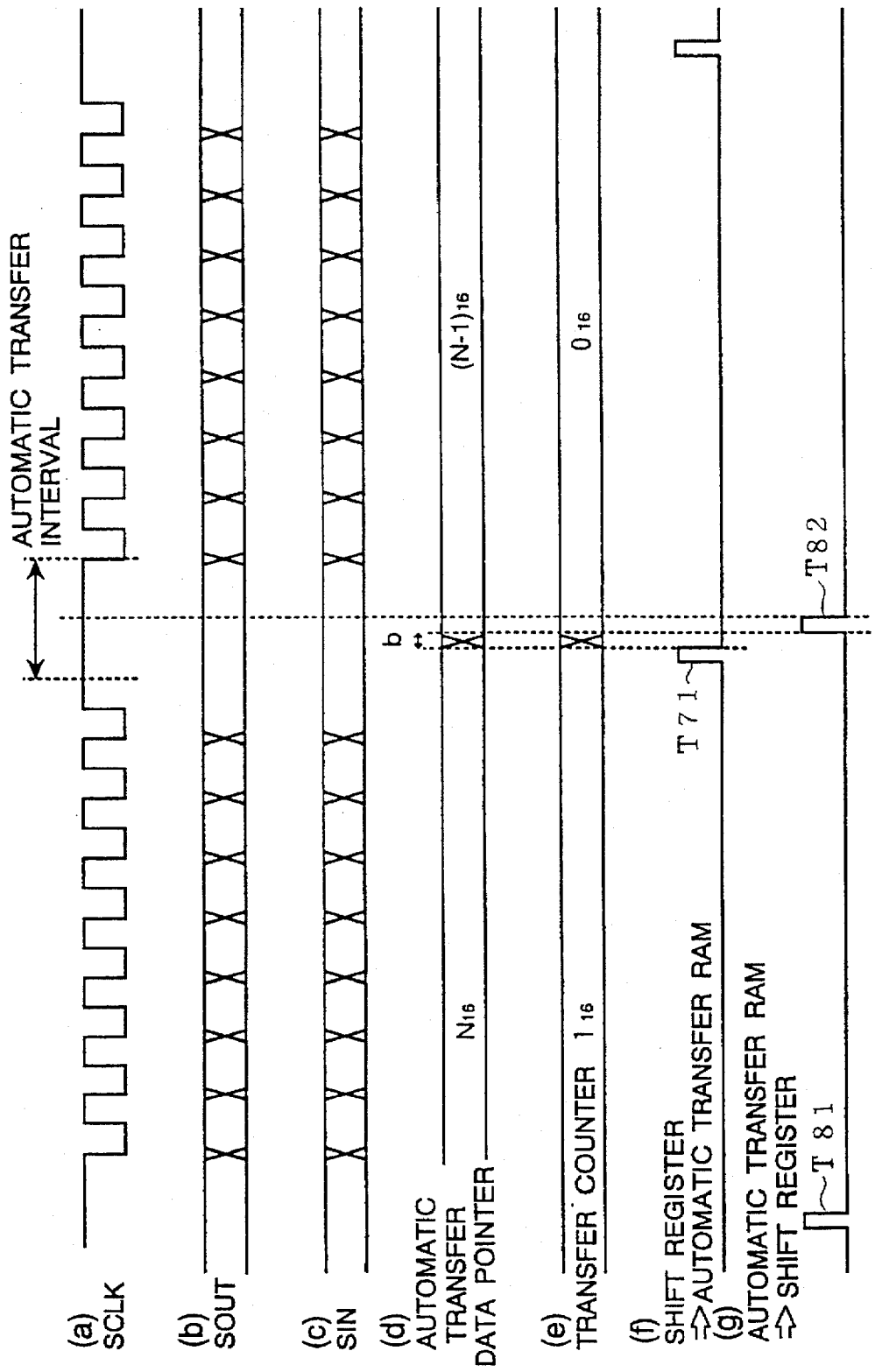
FIG. 8 is a timing chart for describing the operation of the conventional serial input/output circuit shown in FIG. 7.

FIG. 5 is a timing chart for describing the operation of the serial input/output circuit according to the present embodiment. Timing shown in (a) through (e), (g) and (h) in FIG. 5 are respectively identical to those shown in (a) through (e), (f) and (g) in FIG. 8. In the present embodiment, an E signal shown in FIG. 5, (f) is used. An H level period of the E signal indicates an error detection signal input/output period. The error detection signal input/output period falls within a period corresponding to an automatic transfer interval and is equivalent to a period antecedent to a period during which data is transferred from the shift register 8 to the automatic transfer RAM 1.

When the E signal is L in level, the transmission gate 35 is brought into conduction. Thus, both the serial input/output circuits perform in a manner similar to the first embodiment to transfer the data.

When the error detecting circuit 17 employed in the first serial input/output circuit does not yet detect a transfer error after completion of the transfer of 8-bit data, the error detecting circuit 17 sets the internal error detection signal 18 to an L level. Further, if the error detecting circuit 17 of the second serial input/output circuit does not detect a transfer error, then the error detecting circuit 17 sets the internal error detection signal 18 to the L level in the same manner as described above.

Further, when the E signal is brought to an H level, the transmission gate 35 in the first serial input/output circuit is brought into non-conduction and the transmission gate 38 is brought into conduction. Even in the case of the second serial input/output circuit, the transmission gate 35 and the transmission gate 38 are respectively brought into non-conduction and conduction according to the level of the E signal.

Since the transmission gate 38 is in the conducting state in the first serial input/output circuit, the error detection output signal 39 is supplied to the sharing terminal 34. Since the internal error detection signal 18 is of the L level, the error detection output signal 39 also becomes the L level. The error detection output signal 39 is input to a latch circuit 36 employed in the second serial input/output circuit through the sharing terminal 34 and the sharing terminal 33 employed in the second serial input/output circuit. The latch circuit 36 latches the signal input to the sharing terminal 33 at the falling edge of the E signal. Since the input of the latch circuit 36 is L in level in this case, the latch circuit 36 outputs the error detection input signal 37 which is L in level.

Since the internal error detection signal 18 is L in level and the error detection input signal 37 is L in level in the error generation active circuit 46, the level of an error control signal 25 corresponding to the output of the OR circuit 40 remains at the L level. The error control signal 25 is supplied to the OR circuit 27, automatic transfer data pointer 3, error counter 28 and transfer counter 4. Since the error control signal 25 is of the L level, the OR circuit 27 allows the write signal 26 to be sent to the automatic transfer RAM 1 to pass therethrough as it is. Accordingly, the writing of data outputted from the shift register 8 into the automatic transfer RAM 1 is not prohibited. Further, since the error control signal 25 is insignificant, the automatic transfer data pointer 3 and the transfer counter 4 perform normal operations. Namely, the transfer of the data from the shift register 8 to the automatic transfer RAM 1 is performed. Further, the contents of the automatic transfer data pointer 3 and the transfer counter 4 are respectively decremented by "1" during a period b shown in FIG. 5, (d). Next, the data is transferred from the automatic tran1 to RAM 1 to the shift register 8.

When the error detecting circuit 17 employed in the first serial input/output circuit detects a transfer error after completion of the transfer of 8-bit data, the error detecting circuit 17 sets the internal error detection signal 18 to an H level. Then, the H-level error detection output signal 39 in the first serial input/output circuit is transmitted to the second serial input/output circuit as the H-level error detection input signal 37. Incidentally, the error detecting circuit 17 employed in the second serial input/output circuit will be regarded as having not detected the transfer error.

Since the internal error detection signal 18 has reached the H level in the first serial input/output circuit, the error control signal 25 outputted from the OR circuit 40 is rendered H in level. Then, the output of the OR circuit 27 is always maintained at an H level. Namely, the write signal 26 is not transmitted to the automatic transfer RAM 1. Further, the decrement of the contents of the automatic transfer data pointer 3 by "1" is prohibited. Furthermore, the decrement of the count value of the transfer counter 4 by "1" is prohibited. Thus, the error-produced data outputted from the shift register 8 is not written into the automatic transfer RAM 1 during the period corresponding to the automatic transfer interval. Further, since the decrement of the contents by "1" is prohibited, the contents of the automatic transfer data pointer 3 remain unchanged. Accordingly, each of the contents of the automatic transfer RAM 1, the contents of the automatic transfer data pointer 3 and the count value of the transfer counter 4 is maintained at a state at the time that the transfer of the data whose transfer has been completed just previously, has been started.

When the error detection output signal 39 is brought to the H level in the first serial input/output circuit, the H-level signal is outputted to the sharing terminal 34 through the transmission gate 38 during the period corresponding to the automatic transfer interval. Thus, in the second serial input/output circuit, the H-level signal is input to the sharing terminal 34 and the error detection input signal 37 of the H level is outputted from the latch 36. Namely, the OR circuit 40 employed in the second serial input/output circuit with the automatic transfer function outputs the H-level error control signal 25 therefrom. Thus, even in the case of the second serial input/output circuit with the automatic transfer function, each of the contents of the automatic transfer RAM 1, the contents of the automatic transfer data pointer 3 and the count value of the transfer counter 4 is maintained at a state at the time that the transfer of data whose transfer has been completed just previously, has been started.

The above description shows the case in which the error detecting circuit 17 employed in the first serial input/output circuit with the automatic transfer function detects the transfer error, whereas the error detecting circuit 17 employed in the second input/output circuit with the automatic transfer function does not detect the transfer error. However, the error control signals 25 of the H levels are generated in the two serial input/output circuits even when the error detecting circuit 17 employed in the second serial input/output circuit detects the transfer error and the error detecting circuit 17 employed in the first serial input/output circuit does not detect the transfer error. Thus, each of the contents of the automatic transfer RAM 1, the contents of the automatic transfer data pointer 3 and the count value of the transfer counter 4, all of which are employed in each of the two serial input/output circuits, is maintained at the state at the time that the transfer of the data whose transfer has been completed just previously, has been started. Even when the error detecting circuits 17 employed in the two serial input/output circuits detect the transfer errors respectively, the error control signals 25 of the H levels are generated.

The full duplex communication has been described in the present embodiment. However, the serial input/output circuit shown in FIG. 4 can be applied even when a simplex communication is performed wherein one serial input/output circuit with the automatic transfer function performs only data transmission, whereas the other serial input/output circuit with the automatic transfer function carries out only data reception. Even in this case, the same process as that described above is performed.

Incidentally, the present embodiment has described the serial input/output circuit which has been incorporated into the microcomputer. However, the present serial input/output circuit may be incorporated into another semiconductor device as well as incorporated into the microcomputer. A single serial input/output circuit with an automatic transfer function may be used. In this case, the single serial input/output circuit is used together with a control device provided outwardly of the serial input/output circuit, for example.

The serial input/output circuit according to the second embodiment could perform the re-transfer process when only the reception of the data was made. Further, the serial input/output circuit according to the third embodiment could carry out the re-transfer process when only the transmission of the data was made. However, the serial input/output circuit according to the present embodiment is able to perform the re-transfer process when only the reception and transmission of the data are carried out and the full duplex transmission is performed. Further, since the terminals for outputting and transmitting the error detection output signal 39 share the use of one sharing terminal 34 and the terminals for inputting and receiving the error detection input signal 37 share the use of one sharing terminal 33, the number of terminals can be reduced when the serial input/output circuit with the automatic transfer function is incorporated into the semiconductor device or the like.

Embodiment 5

Figure 6:
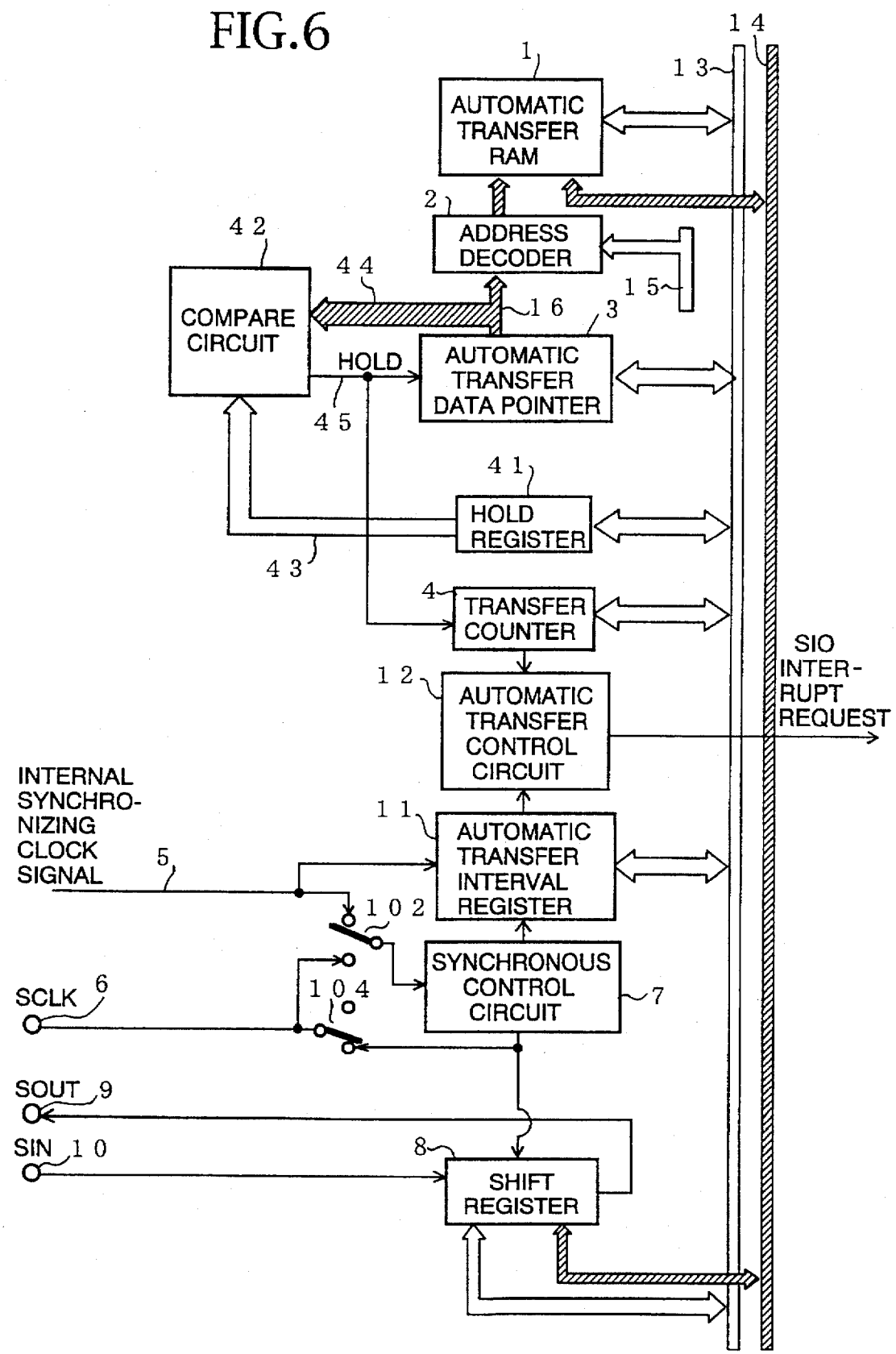
FIG. 6 is a block diagram showing a serial input/output circuit with an automatic transfer function, according to a fifth embodiment of the present invention.

FIG. 6 is a block diagram showing a serial input/output circuit with an automatic transfer function, according to a fifth embodiment of the present invention. In the present embodiment, a serial input/output circuit with an automatic transfer function, which has been incorporated into a microcomputer, will be described by way of example. In the same drawing, reference numeral 41 indicates a hold register to which a specific value is set by software. Reference numeral 42 indicates a compare circuit for comparing a value supplied to an address decoder 2 from an automatic transfer data pointer 3 with the value set to the hold register 41 and making significant a control signal (HOLD signal) 45 outputted therefrom when they coincide with each other. Other elements of structure are identical to those employed in the serial input/output circuit shown in FIG. 1. In this case, however, the error generation active circuit 46 is not provided in the present embodiment. Further, the automatic transfer data pointer 3 and the transfer counter 4 are supplied with the output control signal 45 as an alternative to the error control signal 25. The contents of each of the automatic transfer data pointer 3 and the transfer counter 4 remain unchanged when the output control signal 45 is maintained at a significant level.

Incidentally, a register to which the specific value is set, which constitutes an update prohibiting means, is realized by the hold register 41. The update prohibiting means is realized by the hold register 41 and the compare circuit 42.

The operation of the serial input/output circuit according to the present embodiment will now be described.

A description will now be made of, as an example, the case in which data is automatically transferred between two microcomputers each having the serial input/output circuit constructed as shown in FIG. 6. In the present embodiment, a description will now be made of, as an illustrative example, the case in which a simplex communication is carried out by the two serial input/output circuits with the automatic transfer functions. A transmitting terminal 9 employed in the serial input/output circuit used as the transmitting side is electrically connected to a receiving terminal 10 employed in the serial input/output circuit used as the receiving side. Each of switches 102 and 104 is set in such a manner that, for example, an internal synchronizing clock signal 5 in the microcomputer used as the transmitting side is supplied to the serial input/output circuit of the microcomputer used as the receiving side through a clock input/output terminal 6.

Writing of data into an automatic transfer RAM 1 by a CPU (not shown), the setting of the switches 102 and 104 by the CPU, the setting of the automatic transfer data pointer 3, the transfer counter 4 and an automatic transfer interval register 11 by the CPU, the transfer of data between the automatic transfer RAM 1 and a shift register 8, and the transfer of data from the shift register 8 are identical to those employed in the first embodiment. In the present embodiment, the CPU sets a predetermined value to the hold register 41 before the commencement of an automatic transfer process.

In the serial input/output circuit used as the transmitting side, the compare circuit 42 compares the value supplied to the address decoder 2 from the automatic transfer data pointer 3 with the value set to the hold register 41 and outputs an output control signal 45 of an L level therefrom when they coincide with each other. When the output control signal 45 is L in level, the two serial input/output circuits continue to conduct the automatic transfer process. The value of the automatic transfer data pointer 3 is decremented by "1" upon the automatic transfer process each time the transfer of one-byte data is completed. Thereafter, the set value is supplied to the address decoder 2. When the value of the automatic transfer data pointer 3 coincides with the value in the hold register 41, the compare circuit 42 employed in the serial input/output circuit used as the transmitting side sets the output control signal 45 to an H level corresponding to the significant level.

In the serial input/output circuit used as the transmitting side, data at an address corresponding to the value of the automatic transfer data pointer 3 is shifted from the automatic transfer RAM 1 to the shift register 8 and the data is transferred to the serial input/output circuit used as the receiving side. Since the output control signal 45 is maintained at the H level in the serial input/output circuit used as the transmitting side when the transfer of the data to the receiving side is completed, the value of the automatic transfer data pointer 3 remains unchanged. Thus, the automatic transfer RAM 1 is supplied with address data indicative of the same address as that at which the data shifted to the shift register 8 previous time has been stored. Consequently, the same data as that shifted previous time is shifted from the automatic transfer RAM 1 to the shift register 8. Next, the data is transferred to the receiving side. Thereafter, the same data is repeatedly transferred to the receiving side in the same manner as described above.

When an invalid value is set to the hold register 41 in the serial input/output circuit used as the receiving side, the data received are successively written into their corresponding continuous addresses in the automatic transfer RAM 1 in a manner similar to the first embodiment. The invalid value means a value which is unable to be specified to any addresses in the automatic transfer RAM 1. When the predetermined value has been set to the hold register 41 in the serial input/output circuit used as the receiving side, the received data is hereafter repeatedly written into the address, corresponding to the predetermined value, in the automatic transfer RAM 1 when the value of the automatic transfer data pointer 3 has reached the predetermined value.

According to the present embodiment, the serial input/output circuit can provide a user with an environment under which the cause of an error can be easily analyzed as in the case where the error always occurs in data read from a specific address in the automatic transfer RAM 1 when a program test for the automatic transfer process is being carried out. Namely, since the data at the specific address is repeatedly outputted by allowing the user to set the value corresponding to the specific address to the hold register 41, the user can easily analyze the cause of the error.

The present embodiment shows the form in which the error generation active circuit 46 is not provided. However, the hold register 41 and the compare circuit 42 may be provided within each of the serial input/output circuits with the automatic transfer functions, according to the first through fourth embodiments. In this case, a signal produced by summing logically the error control signal 25 produced from the error generation active circuit 46 and the output control signal 45 produced from the compare circuit 42 is supplied to each of the automatic transfer data pointer 3 and the transfer counter 4. If such a construction is made, then the re-transfer process employed in each of the first through fourth embodiments can be performed and the cause of the error can be easily analyzed.

Incidentally, the present embodiment has described the serial input/output circuit which has been incorporated into the microcomputer. However, the present serial input/output circuit may be incorporated into another semiconductor device as well as incorporated into the microcomputer. A single serial input/output circuit with an automatic transfer function may be used. In this case, the single serial input/output circuit is used together with a control device provided outwardly of the serial input/output circuit, for example.

Since the serial input/output circuit with the automatic transfer function is provided with the update prohibiting means for prohibiting the value of the pointer means and the value of the transfer counter from being updated, as has been described above, an advantageous effect can be brought about in that the re-transfer process can be done without the need for the control device such as the CPU during the automatic transfer process.

When the value of a pointer means and the value of a transfer counter are prohibited from being updated when an error detecting circuit detects a data error or the occurrence of an error in data is notified from a transfer destination or opposite party, correct data can be re-transferred without a control device such as a CPU and in a short time even if a transfer error occurs during automatic transfer.

When a serial input/output circuit has a continuous number monitoring means for detecting whether the transfer of data from the same address in a memory means exceeds a predetermined number of times, it is possible to avoid that the automatic transfer is not finished for all time by the repetition of the re-transfer.

When the serial input/output circuit with the automatic transfer function is provided with a sharing terminal for outputting either one of a signal for notifying information as to whether or not an error occurs in data to a transfer opposite party, and transfer data, the number of terminals employed in a semiconductor device or the like can be reduced when the serial input/output circuit is incorporated into the semiconductor device or the like.

Even when the serial input/output circuit with the automatic transfer function includes a sharing terminal for inputting either one of a signal and transfer data sent from a transfer opposite party to notify information as to whether or not an error occurs in data, the number of terminals employed in a semiconductor device or the like can be reduced when the serial input/output is incorporated into the semiconductor device or the like.

When the serial input/output circuit with the automatic transfer function has a first sharing terminal for outputting either one of a signal for notifying information as to whether or not an error occurs in data to a transfer opposite party, and transfer data, and a second sharing terminal for inputting a signal and transfer data sent from the transfer opposite party to notify the information as to whether or not the error occurs in the data, the number of terminals employed in a semiconductor device or the like can be reduced when the serial input/output circuit with the automatic transfer function is incorporated into the semiconductor or the like, while re-transfer functions at the time of a duplex communication and a simplex communication are being maintained.

When the serial input/output circuit is constructed such that when a value set to a register to which a specific value has been set, coincides with a value in the pointer means, the value of the pointer means is prohibited from being updated, the serial input/output circuit can provide a user with an environment under which the cause of an error can be easily analyzed.

What is claimed is:

1. A serial input/output circuit with an automatic transfer function comprising:

memory means for storing respective data to be transferred;

transfer means for successively serially transferring the respective data stored in said memory means;

pointer means for storing an address pointer for addressing data in said memory means, updating the address pointer after completion of a transfer of a first data signal, and supplying the address pointer to said memory means;

a transfer counter for storing a transfer count indicating a quantity of untransferred data and updating the transfer count after completion of the transfer of the first data signal; and update prohibiting means comprising a logic circuit including a plurality of input terminals for receiving error signals indicative of data errors, a first output terminal coupled to said transfer counter and said pointer means, a second output terminal coupled to said memory means, said update prohibiting means producing a first control signal for prohibiting the transfer count from being updated and a second control signal for prohibiting writing to said memory means when transfer of the first data has been completed and a data error occurs.

2. The serial input/output circuit according to claim 1, wherein said update prohibiting means includes:

an error detecting circuit for detecting whether an error exists in data received from a transfer opposite party; and an error generation active circuit including first and second input terminals and first and second output terminals, the first input terminal receiving a signal from the transfer opposite party indicative of a data error in data transmitted to the transfer opposite party, the second input terminal receiving the output from said error detecting circuit, the first output terminal being coupled to said transfer counter and said pointer means, the second output terminal being coupled to said memory means, the error generation active circuit producing the first control signal at the first output terminal for prohibiting the address pointer and the transfer count from being updated and producing the second control signal at the second output terminal for preventing writing to said memory means upon an occurrence of at least one of: said error detecting circuit 1) detecting a data error in data received from the transfer opposite party; and 2) receiving an error signal from the transfer opposite party, indicating a data error in data transmitted to the transfer opposite party.

3. The serial input/output circuit according to claim 2 including a sharing terminal coupled to said error detecting circuit and said transfer counter for selectively outputting at least one of 1) a signal for notifying the transfer opposite party whether an error has occurred in data received from the transfer opposite party, and 2) data to the transfer opposite party.

4. The serial input/output circuit according to claim 2 including a sharing terminal coupled to the first input terminal of said error generation active circuit and said transfer counter for selectively receiving at least one of 1) a signal sent from the transfer opposite party which indicates whether an error has occurred in data transmitted to the transfer opposite party and 2) data sent from the transfer opposite party.

5. The serial input/output circuit according to claim 2 including:
- a first sharing terminal coupled to said error detecting circuit and said transfer counter for selectively outputting to a transfer opposite party at least one of 1) a signal for notifying the transfer opposite party whether an error has occurred in data received from the transfer opposite party and 2) data;
- a second sharing terminal coupled to the first input terminal of said error generation active circuit and said transfer counter for selectively receiving at least one of 1) a signal sent from the transfer opposite party indicating whether an error has occurred in data transmitted to the transfer opposite party, and 2) data sent from the transfer opposite party;
- transmission control means coupled to said first sharing terminal, said error detecting circuit, and said transfer counter for supplying a signal to said first sharing terminal for notifying the transfer opposite party whether an error has occurred in data transmitted by the transfer opposite party during an automatic transfer interval between a first data transfer and a next data transfer; and
- signal capturing means coupled to the second sharing terminal and the first input terminal of said error generation active circuit for receiving a signal input to said second sharing terminal during the automatic transfer interval and supplying the signal to said error generation active circuit.

6. The serial input/output circuit according to claim 2 including error counting means coupled to the first output terminal of said error generation active circuit for incrementing a count each time the first control signal is produced and for outputting a transfer count exceeded signal when a number of erroneous transfers of data from the same address in said memory means exceeds a predetermined number.

7. The serial input/output circuit according to claim 6 including a sharing terminal coupled to said error detecting circuit and said transfer counter for selectively outputting to a transfer opposite party at least one of 1) a signal for notifying the transfer opposite party whether an error has occurred in data received from the transfer opposite party, and 2) data.

8. The serial input/output circuit according to claim 6 including a sharing terminal coupled to the first input terminal of said error generation active circuit and said transfer counter for selectively receiving at least one of 1) a signal sent from the transfer opposite party indicating whether an error has occurred in data transmitted to the transfer opposite party, and 2) data sent from the transfer opposite party.

9. The serial input/output circuit according to claim 6 including:
- a first sharing terminal coupled to said error detecting circuit and said transfer counter for selectively outputting to a transfer opposite party at least one of 1) a signal for notifying the transfer opposite party whether an error has occurred in data received from the transfer opposite party, and 2) in data;
- a second sharing terminal coupled to the first input terminal of said error generation active circuit and said transfer counter for selectively receiving at least one of 1) a signal sent from the transfer opposite party indicating whether an error has occurred in the data transmitted to the transfer opposite party and 2) data sent from the transfer opposite party;
- transmission control means coupled to said first sharing terminal, said error detecting circuit, and said transfer counter for supplying a signal to said first sharing terminal for notifying the transfer opposite party whether an error has occurred in data transmitted by the transfer opposite party during an automatic transfer interval between a first data transfer a next data transfer; and
- signal capturing means coupled to said second sharing terminal and the first input terminal of said error generation active circuit for receiving a signal input to said second sharing terminal during the automatic transfer interval and supplying the signal to said error generation active circuit.

10. The serial input/output circuit according to claim 2 wherein said error generation active circuit comprises:
- a transistor including a drain, a gate, and a source, the gate receiving the output from said error detecting circuit, the drain receiving error signals from the transfer opposite party, and the source being coupled to ground;
- an inverter including a first input terminal and a first output terminal, the first input terminal being coupled the drain of said transistor, the first output terminal being coupled to said transfer counter and said pointer means, said inverter producing the first control signal at the first output terminal; and
- an OR gate including second and third input terminals and a second output terminal, the second input terminal being coupled to the first output terminal of said inverter, the third input terminal receiving a write signal for enabling writing to said memory means, the second output terminal being coupled to said memory means, said OR gate producing the second control signal at the second output terminal to block the write signal and prohibit writing to said memory means when a data error occurs.

11. The serial input/output circuit according to claim 2 wherein said error generation active circuit comprises:
- a first OR gate including first and second input terminals and a first output terminal, the first input terminal receiving the output from said error detection active circuit, the second input terminal receiving an error signal from a transfer opposite party, the first output terminal being coupled to said transfer counter and said pointer means, said first OR gate producing the first control signal at the first output terminal to prohibit updating of the address pointer and the transfer count when a data error occurs; and
- a second OR gate including third and fourth input terminals and a second output terminal, the third input terminal receiving a write signal to enable writing to said memory means, the third input terminal being coupled to the first output terminal of the first OR gate, the second output terminal being coupled to said memory means, the second OR gate producing the second control signal at the second output terminal to block the write signal and prevent writing to the memory means memory means when a data error occurs.

12. The serial input/output circuit according to claim 1 wherein said update prohibiting means includes:

a register having a specific value; and a compare circuit for comparing the specific value and the address pointer and producing an output prohibiting the address pointer and the transfer count from being updated when the address pointer and the specific value coincide with each other.

* * * * *